G. W. GUSTAFSON.
BOTTLE CLOSURE.
APPLICATION FILED OCT. 2, 1911.
1,108,360. Patented Aug. 25, 1914.
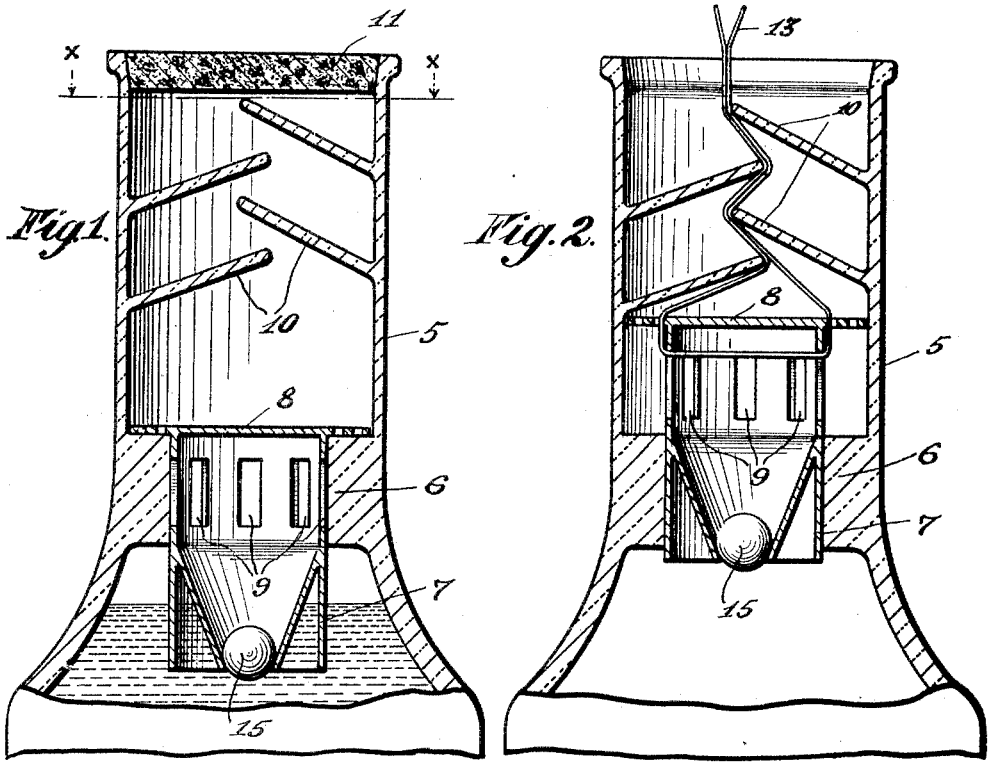
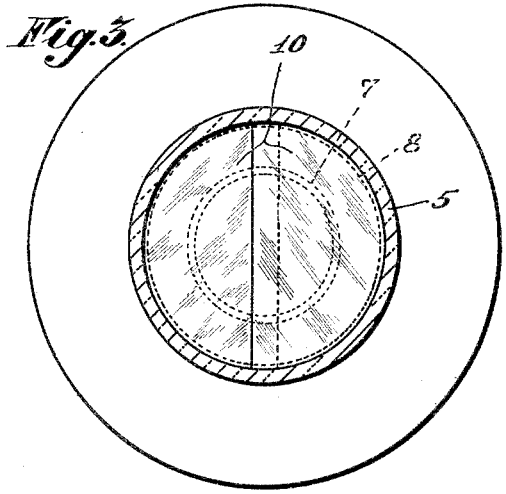
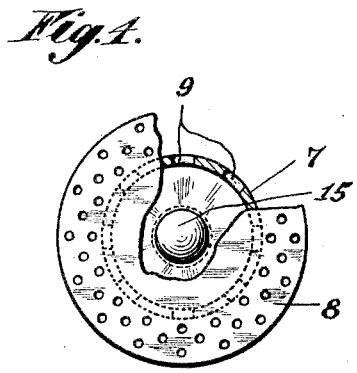
Witnesses
James E. Sproll.
Clara A. Harm.
Inventor
Gustaf W. Gustafson.
By Adams & Brooks
Attorneys

UNITED STATES PATENT OFFICE.

GUSTAF W. GUSTAFSON, OF SEATTLE, WASHINGTON.

BOTTLE-CLOSURE.

1,108,360.  Specification of Letters Patent. Patented Aug. 25, 1914.

Application filed October 2, 1911. Serial No. 652,422.

*To all whom it may concern:*

Be it known that I, GUSTAF W. GUSTAFSON, a citizen of the United States of America, and a resident of the city of Seattle, in the county of King and State of Washington, have invented certain new and useful Improvements in Bottle-Closures, of which the following is a specification.

The object of this invention is to make refilling of bottles so difficult that an attempt to refill would not, ordinarily, be worth the trouble required. I attain such object by devices illustrated in the accompanying drawing in which—

Figure 1 is a mid sectional view in elevation of the upper portion of a receptacle, (within which portion my invention is embodied), showing some parts disposed as they would be when such receptacle is full of a liquid. Fig. 2 is a like view except that said parts are shown as disposed as they would be when such receptacle is prepared for filling with a liquid. Fig. 3 is a plan view in cross-section of same on broken line *x—x* and Fig. 4 is a plan view of details of my invention with a portion of one part broken away to show other parts, some of which are in cross-section.

Like reference numbers refer to like parts throughout the drawing.

Referring to the drawings, 5 represents the neck of a bottle whose internal diameter is constricted at its lower part by a flange 6 and within such constricted portion is a closely fitting vertically movable stopper 7 comprising a hollow cylinder whose upper end is closed by a disk shaped cap 8, whose outer edge extends to and engages with the wall of the neck 5. That portion of said disk shaped cap which extends outwardly from the cylindrical portion of stopper 7 is perforated with numerous holes through which a liquid may flow only when the stopper 7 is raised so that said cap 8 does not rest on the top of the flange 6.

The stopper 7 in its cylindrical portion near the cap 8 is provided with a plurality of holes 9 through which a liquid may flow only when said stopper 7 is raised so that said holes 9 are higher than said flange 6. The lower end of stopper 7 is provided with a funnel shaped aperture within which is disposed a ball 15, of suitable material, adapted to act as a valve to obstruct the flow of a liquid in a downward direction but which would permit a flow of liquid into the stopper 7 if the bottle be inverted and if, when the bottle be so inverted, the said stopper 7 is in a position so that holes 9 are not obstructed by flange 6 (as shown in Fig. 2) then a liquid may flow through said stopper 7.

Within the neck 5, above the flange 6 and the top of stopper 7, are disposed web-like wings or deflectors 10, two each from opposite sides of said neck 5, said deflectors 10 being semi-circular in form and so placed that the upper deflector on one side has its straight edge projecting within the space between the two deflectors on the opposite side while the lower deflector on said opposite side has its straight edge project within the space between the two deflectors on the said one side as shown in Fig. 1 and in Fig. 2, whereby a wire or other instrument may not readily be guided downwardly from the top of the bottle to reach the stopper 7. A suitable cork or other means for closing the opening at the top of the neck 5 is disposed as shown in Fig. 1.

The looped wire 13 passes through holes in the disk shaped cap 8 thence its ends lead upwardly to and through the neck of the bottle as shown in Fig 2 which represents my invention as embodied in a bottle ready to be filled with a liquid.

The operation of filling a bottle of my invention constructed as shown and described consists in disposing the stopper 7 and wire 13 as illustrated, then invert the bottle, whereupon the ball 15 (which should be of material heavier than water) will fall away from the funnel shaped outlet of stopper 7. A desired liquid is then injected by pressure upwardly into the bottle to a desired amount whereupon the bottle may be placed upright and the looped wire 13 be withdrawn to allow stopper 7 to drop down to its position on flange 6 as shown in Fig. 1. The cork 11 may then be forced into the opening of neck 5.

Manifestly, in the process of making a bottle of my invention the same is molded in two parts and united after the stopper 7 has been placed in its position.

Having thus described my invention, what I claim as new and desire to secure by Letters Patent of the United States of America, is:—

1. In apparatus of the class described, the combination with a bottle having its neck constricted at some distance below its mouth to form a plane annular valve seat surrounding a cylindrical passage below the same, of a tubular, laterally perforated, cylindrical member sliding in said passage, closed at its upper end provided at its upper end with a plane perforated annular flange fitting said seat, and with an internal downwardly-converging hollow conical frustum below the perforations, and a ball normally closing the lower end of said frustum and free within the same.

2. In apparatus of the class described, the combination with a bottle having its neck constricted at some distance below its mouth to form a plane annular valve seat surrounding an axial cylindrical passage leading to the body of the bottle, of a hollow cylindrical member sliding in said passage closed at its upper end, laterally perforated near its upper end, provided at its upper end with an external annular flange fitting said seat and having below the perforations in said member an internal, downwardly convergent, hollow frustum peripherally united at its upper end with said member, and a loose ball normally closing the lower end of said frustum; said neck being provided with a baffle plate in position to limit the upward sliding of said member.

Signed at Seattle, Washington, this 22 day of Sept. 1911.

GUSTAF W. GUSTAFSON.

Witnesses:
ARLITA ADAMS,
WILLIAM H. GORHAM.

Copies of this patent may be obtained for five cents each, by addressing the "Commissioner of Patents, Washington, D. C."